W. R. McLAIN.
HICKEY.
APPLICATION FILED JUNE 6, 1908.

1,017,985.

Patented Feb. 20, 1912.

Witnesses:
John H. Parker
Aline Tarr

Inventor:
William R. McLain
by Macleod, Calver, Copeland & Dike
Attorneys.

UNITED STATES PATENT OFFICE.

WILLIAM R. McLAIN, OF PHILADELPHIA, PENNSYLVANIA, ASSIGNOR TO THE MACALLEN COMPANY, OF BOSTON, MASSACHUSETTS, A CORPORATION OF MASSACHUSETTS.

HICKEY.

1,017,985.  Specification of Letters Patent.  Patented Feb. 20, 1912.

Application filed June 6, 1908. Serial No. 437,107.

*To all whom it may concern:*

Be it known that I, WILLIAM R. McLAIN, a citizen of the United States, residing at Philadelphia, in the county of Philadelphia, State of Pennsylvania, have invented a certain new and useful Improvement in Hickeys, of which the following is a specification, reference being had therein to the accompanying drawings.

My invention has for its object an improvement in that means frequently known as a hickey which is used for attaching a chandelier or other like object to an insulating coupling, by which the chandelier or the like is suspended from the ceiling or wall. As is well known to those skilled in the art, a hickey is a form of union or coupling provided with holes or slots in its sides to permit the wires carried in the interior of the conduit to pass an insulating coupling or joint.

Heretofore so far as is known to me, in putting up electric chandeliers and the like from the end of which protrude two or more connecting wires, it has been necessary to pass the wires up through the central passage of the hickey, then screw the hickey onto the end of the pipe comprising the stem of the chandelier, then by means of a hook or other similar tool fish the wires out through the side openings in the hickey; after which the chandelier and hickey are screwed to the insulating joint and to the pipe in the ceiling and the wires are spliced or connected around the insulating joint. The operation of fishing the wires through the side opening in the hickey, especially if the wires are thick or stiff, is a difficult one consuming considerable time, and likely to result in injury to the insulation of the wires.

My invention has for its object a new and improved hickey which does away with the necessity for fishing the wires through the side openings in the hickey.

My new and improved hickey costs little or no more to construct, holds the chandelier as securely, and may be put in place very quickly and without danger of injuring the insulation on the wires.

The invention will be fully understood from the following description taken in connection with the accompanying drawings, and the novel features are pointed out and clearly defined in the claims at the close of the specification.

Figure 1:
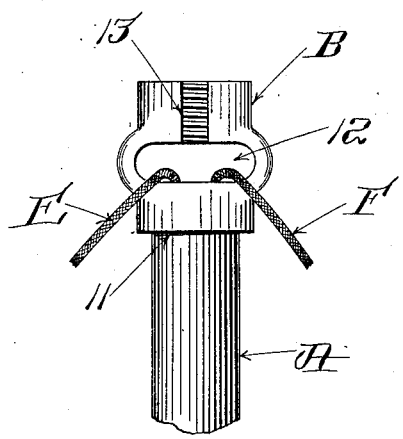
Figure 2:
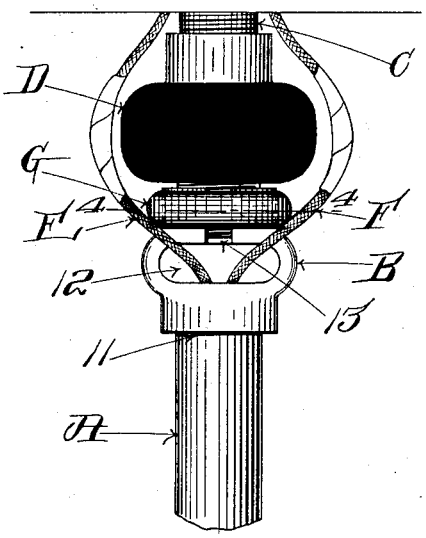
Figure 3:
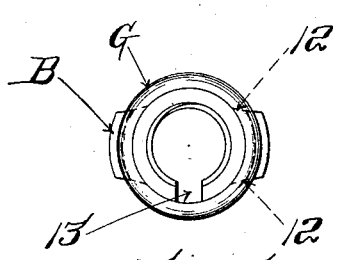
Figure 4:
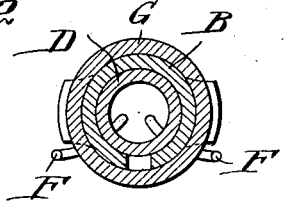
Figure 5:
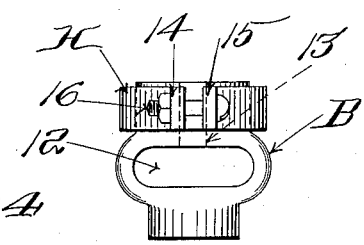

In the drawings,—Figure 1 shows my improved hickey applied to the upper end of the stem or pipe of a chandelier, the wires having been bent down so that the hickey is ready to receive the collar and be screwed to the insulating joint. Fig. 2 shows the connection complete, all the parts being in place. Fig. 3 is a plan view of the hickey shown in Fig. 1 with the reinforcing ring in place. Fig. 4 is a section on line 4—4 Fig. 2. Fig. 5 shows a modification embodying my invention.

Referring to the drawings,—at A is indicated the upper end of the pipe or stem of the chandelier. This is screw threaded as shown at 11. At B is shown the hickey. The suspending pipe from the ceiling is designated C (see Fig. 2) and the insulating coupling D.

The hickey B is tapped so that it may be screwed onto the threaded upper end of the chandelier and at its upper end is tapped to fit the screw threads on the lower end of the insulating joint D, and is provided with the usual side openings 12, 12, through which the wires from the chandelier pass when the parts are in position. The upper half of the hickey B is slotted vertically on one side as shown at 13, said slot 13 connecting with one of the two side openings 12. It will be seen that when it is desired to put the chandelier in place, the wires E and F may be inserted through the central opening of the hickey, and then bent down sidewise through the slot 13, so that they stick out through the side opening 12. It will be seen that this construction does away with the necessity of fishing the wires through the side openings 12. A small collar G is then slipped on over the slotted end of the hickey B. This collar is a good fit for the end of the hickey and serves to give this end of the hickey the desired strength, so that the hickey may be screwed onto the lower end of the insulating joint D and hold the chandelier as securely as hickeys of the ordinary construction. The chandelier and attached hickey are then put in place by screwing the upper end of the hickey onto the lower end of the insulating joint D which is itself screwed to the depending end of the suspending pipe C. The wires E and F are then connected or spliced to the wires from the ceiling and the joint may be covered with the ordinary canopy if desired.

While I have shown my improved hickey as provided with the ring G, this ring being a solid ring, it will of course be understood that a split ring may be employed, or if the end of the hickey is made strong enough, the necessity of a ring may be entirely done away with. In Fig. 4 will be seen a hickey provided with a split ring H having two lugs 14 and 15 connected by a screw 16 by means of which the collar may be tightened about the end of the hickey.

By the use of my improved hickey, the work of putting in place chandeliers and the like is greatly diminished and at the same time the danger of impairing the insulation is obviated.

It will be understood of course that the device embodying my invention may be used wherever hickeys of the ordinary and well known construction are employed.

What I claim is:

1. The improved hickey comprising two end portions screw threaded for connection with proximate members, having a side opening therein and a slot extending through one of said end portions and connecting with said side opening.

2. The combination with a hickey having its ends screw threaded for connection with proximate members, and having a side opening and a slot through one of said threaded ends connecting with said side opening, of a strengthening ring about said slotted end.

3. In an electric light fixture, a tubular member split at one end for the passage of wires, and means engaging the split end of the member interiorly and exteriorly.

4. In an electric light fixture, a wire carrying tube, an insulating joint and a hickey interposed as a connection between said tube and joint and split throughout a portion of its length for the passage of wires.

5. In an electric light fixture, a tubular member split at one end for the passage of wires and a coöperating member encircling the split end of the first mentioned member.

6. In an electric light fixture, a tubular member split throughout a portion of its length for the passage of wires, and an insulating joint directly connected to said member.

In testimony whereof I affix my signature, in presence of two witnesses.

WILLIAM R. McLAIN.

Witnesses:
 W. HAMILTON ROSE,
 FREDERICK BEYER.

Copies of this patent may be obtained for five cents each, by addressing the " Commissioner of Patents, Washington, D. C."